United States Patent [19]

Ohno

[11] Patent Number: 5,047,880
[45] Date of Patent: Sep. 10, 1991

[54] MAGNETIC DISK PACK WITH A SERVO RECORDING SURFACE

[75] Inventor: Yoshitaka Ohno, Amagasaki, Japan

[73] Assignee: Mitsubishi Denki Kabushiki Kaisha, Japan

[21] Appl. No.: 345,169

[22] Filed: May 1, 1989

[30] Foreign Application Priority Data

Dec. 5, 1988 [JP]  Japan .................................. 63-308109

[51] Int. Cl.$^5$ ................................................ G11B 5/09
[52] U.S. Cl. .................................... 360/78.14; 360/49; 360/77.08; 360/77.11
[58] Field of Search ................ 360/40, 49, 72.2, 77.05, 360/77.07, 77.08, 77.11, 78.14

[56] References Cited

U.S. PATENT DOCUMENTS

| 4,630,144 | 12/1986 | Kutaragi | 360/77.11 |
| 4,882,583 | 11/1989 | Dimitri | 360/39 |
| 4,910,617 | 3/1990 | Brunnett et al. | 360/77.08 |

OTHER PUBLICATIONS

"Interchangeable Magentic Twelve-Disk Pack (100 Mbytes), c 6287", in the JIS Handbook: Information Processing, Japanese Standardes Association, 1986, p. 911.

Primary Examiner—Vincent P. Cartney
Assistant Examiner—David L. Robertson
Attorney, Agent, or Firm—Leydig, Voit & Mayer

[57] ABSTRACT

A magnetic disk pack includes a plurality of coaxially stacked magnetic disks on one of which is formed a servo recording surface for generating a servo positioning signal. The servo tracks on the servo recording surface include an index pattern consisting of missing pairs of dibits on adjacent pairs of odd and even numbered servo tracks. The index is formed at a starting and ending position of the tracks to mark the circumferential position thereof. In the index pattern, at least three non-missing dibit pairs are interposed between adjacent missing dibit pairs. The examples of the index patterns are: 011110, 0111110, 01111110, etc., in which four, five, or six 1s (representing the non-missing dibit pairs) are inserted between two 0s (representing missing dibit pairs). This organization of the index pattern is effective in reducing the adverse effects of the missing dibits in the index pattern upon the radial position signal obtained from the dibits on the servo tracks.

3 Claims, 4 Drawing Sheets

FIG. 4

```
                        INDEX
                     ⌒⎯⎯⎯⎯⎯⎯⎯⌒
(M1)    ···1 1 1 1 0 1 0 1 1 0 1 1 1 1 1···
                       INDEX
                    ⌒⎯⎯⎯⎯⎯⎯⎯⎯⌒
(M2)    ···1 1 1 1 0 1 1 1 0 1 1 1 1 1 1···
                      INDEX
                   ⌒⎯⎯⎯⎯⎯⎯⎯⎯⎯⌒
(M3)    ···1 1 1 1 0 1 1 1 1 0 1 1 1 1 1···
                     INDEX
                  ⌒⎯⎯⎯⎯⎯⎯⎯⎯⎯⎯⌒
(M4)    ···1 1 1 1 0 1 1 1 1 1 0 1 1 1 1···
                    INDEX
                 ⌒⎯⎯⎯⎯⎯⎯⎯⎯⎯⎯⎯⌒
(M5)    ···1 1 1 1 0 1 1 1 1 1 1 0 1 1 1···
                     INDEX
               ⌒⎯⎯⎯⎯⎯⎯⎯⎯⎯⎯⎯⎯⎯⌒
(M6)    ···1 1 1 1 0 1 1 1 1 ····· 1 1 1 0 1 1···
```

MAGNETIC DISK PACK WITH A SERVO RECORDING SURFACE

BACKGROUND OF THE INVENTION

This invention relates to interchangeable packs of coaxially stacked magnetic disks which are utilized in information processing systems, and more particularly to an improvement in the index pattern on the servo recording surface which is formed on one of the magnetic disks of such packs.

In information processing systems, interchangeable magnetic disk packs are in wide use. These disk packs consist of a plurality of coaxially stacked magnetic disks which are rotatably accommodated in a housing; data are recorded on the concentric tracks formed on the data recording surfaces formed on the magnetic disks. The disks in the pack are rotated together when information is written into or read out from the data recording surfaces of the disks. A servo recording surface is formed on one of the disks of a pack for the positioning of the read/write head relative to the data recording tracks on the data recording surfaces of the disks. The servo recording surface comprises concentric servo tracks on which regular patterns of positive and negative bits are recorded. In the odd numbered tracks are recorded, for example, positive dibits (i.e. a pair of succeeding positive and negative pulses) at a predetermined fixed circumferential spacing, while on the even numbered tracks are recorded negative dibits (i.e. a pair of succeeding negative and positive pulses) at the same predetermined circumferential spacing). The dibits on the odd numbered tracks are circumferentially displaced from the dibits on the even numbered tracks by half the spacing between the dibits on an odd or even numbered track. The servo tracks formed on the servo recording surface are radially displaced by half the pitch (i.e. width) of the tracks with respect to the data recording tracks formed on the data recording surfaces, and the servo head of the recording and reproducing device runs between the odd and even numbered servo tracks to generate a signal whose level is approximately proportional to the radial position of the head. This signal is used as the radial position signal for positioning the read/write head of the information processing device.

Thus, the positive and negative dibits, respectively, are disposed on the odd and even numbered servo tracks on the servo recording surface at a fixed circumferential spacing along a circumferential direction. However, at a certain circumferential position, i.e., at the starting and ending points of the tracks, some of the dibits are dropped to form a special pattern (called an index pattern) of dibits which marks the starting and ending points of the tracks.

Let us describe the above structure of the servo recording surface of a magnetic disk pack more in detail in reference to FIG. 1, which shows, in the upper three rows (a) through (c) thereof, an index pattern on the servo tracks which is identical to that shown in the chapter: "Interchangeable Magnetic Twelve-Disk Pack (100 Mbytes), C 6287" in the "JIS Handbook: Information Processing," Japanese Standards Association, 1986, p. 911.

The second and third rows (b) and (c) in FIG. 1 show an index portion of a representative pair of odd and even numbered servo tracks formed on the servo recording surface of a disk pack comprising a plurality of coaxially stacked magnetic disks. The odd and even numbered concentric servo tracks, as shown in rows (b) and (c) in FIG. 1, alternate in the radial direction on the servo recording surface of the magnetic disk pack to cover an annular servo domain on the servo recording surface. On the odd numbered tracks, positive dibits b1 (which consist of two successive reversions of magnetization, the first of which has two north poles N adjacent to each other and the second of which has two south poles S adjacent to each other, as shown in the figure) are formed in a fixed predetermined circumferential spacing. However, at the index portion marking the starting and ending circumferential position of the tracks, some of the dibits are dropped and missing. The missing dibits are shown by a pair of dotted vertical lines b2 in row (b) in FIG. 1. Similarly, on the even numbered tracks negative dibits b1 (two adjacent south poles S and two immediately succeeding adjacent north poles N) are formed at a fixed predetermined circumferential spacing. At the index portion, the dibits c2 which immediately precede the missing dibits b2 of the adjacent odd numbered track are dropped and missing, as shown by pairs of dotted vertical lines in row (c) in FIG. 1.

Thus, when the servo surface on the rotating magnetic disk of the disk pack moves toward the left in the figure with respect to the servo head 2 positioned between an adjacent pair of odd and even numbered servo tracks (i.e., in effect, the servo head 2 moves toward the right in the figure between the odd and even numbered tracks (b) and (c) with respect to the servo surface), a voltage is induced whose waveform d comprises positive dibits d1 (i.e. pairs of a positive and an immediately succeeding negative pulse) corresponding to positive dibits b1 on the odd numbered track (b), and negative dibits d2 (i.e. pairs of a negative and an immediately succeeding positive pulse) corresponding to negative dibits c1 on the odd numbered track (c). Except where the servo head 2 is at the index portion, pairs of the negative dibit d2 and the immediately succeeding positive dibit d1, which pairs are each represented by a numeral 1 at the top row (a) in FIG. 1, recur regularly at a predetermined period determined by the circumferential spacing of the dibits in the servo tracks. However, when the servo head 2 moves over a missing pair of a negative and a positive dibit c2 and b2 in the index portion of the even and odd numbered tracks (c) and (b) (missing dibit pairs are each represented by a numeral 0 at the top row (a) in FIG. 1), a dibit pair corresponding to the missing dibit pairs c2 and b2 vanishes in the waveform d, as shown in the fourth row (d) in FIG. 1, wherein the missing dibits are represented by dotted curves. The index portion shown in FIG. 1 consists of the pattern: 010110, as shown at the top row (a) thereof.

FIG. 2 shows a portion of the index pattern in greater detail, wherein the pairs of a negative and an immediately succeeding positive dibit on the adjacent even and odd numbered tracks (b) and (c) are represent by 1's, the absence of such a pair by a 0. Thus, the portion represented in FIG. 2 comprises the pattern: 101. Accordingly, the output waveform d of the servo head comprises a corresponding dibit pair pattern of 101, wherein the missing dibit pair is represented by a dotted curve.

A position signal is obtained from the output waveform d of the servo head 2 via a circuit such as that shown in FIG. 3. The servo head 2 moves relative to the servo recording surface 1 in the circumferential direction between the odd and even numbered tracks thereon, to supply to the amplifier 3 an output voltage having the waveform d shown in FIG. 1. The heights of the positive and negative dibits d1 and d2 of the waveform d correspond to the radial position of the servo head 2 with respect to the odd and even tracks (b) and (c). The amplifier 3 outputs an amplified waveform d to a discriminator circuit 4 coupled thereto. The discriminator circuit 4 discriminates the positive and the negative dibits d1 and d2 from each other, and outputs pulse trains e and f (waveforms are shown in rows (e) and (f) in FIG. 1), corresponding to the positive and negative dibits, respectively. Output pulse trains e and f also correspond to peak level holding circuits 5a and 5b, respectively. As shown in row (e) in FIG. 1, the waveform e consists of positive pulses, each of which corresponds to a positive pulse (shown in solid black in FIG. 1) of a positive dibit d1 of the waveform d. Thus, except when the head 2 is at the index portion, the waveform e consists of positive pulses occurring at a fixed period. At the index portion, the pulses (shown by dotted curves) corresponding to a missing pair of dibits (shown by a 0 at the top row (a) in FIG. 1) are dropped. Similarly, as shown at row (f) in FIG. 1, the waveform f consists of positive pulses, each of which corresponds to a negative pulse indicated by horizontal lines in FIg. 1 of a negative dibit d2 of the waveform d. Thus, except when the servo head 2 is at the index portion, the waveform f consists of positive pulses occurring at the same fixed period as the pulses of the waveform e. At the index portion, the pulses (shown by dotted curves) corresponding to a missing pair of dibits (shown by a 0 in the top row (a) in FIG. 1) vanish.

The peak hold circuits 5a and 5b coupled to the outputs e and f of the discriminator circuit 4, respectively, effect the peak level holding operation, and thereby output the signals Xe and Xf, respectively, whose waveforms are shown in rows (e) and (f) in FIG. 1. The circuits 5a and 5b are charged to each peak level of the waveforms e and f, respectively, to be discharged thereafter at a predetermined time constant. Thus, the outputs Xe and Xf of the circuits 5a and 5b have a sawtooth-shaped waveform, whose period is fixed outside of the index portion. The period of the waveforms Xe and Xf is altered in the index portion according to the pattern of the index, as shown in the figure. The period of the waveforms Xe and Xf is doubled by an occurrence of a 0 between two 1's. The subtractor 6 coupled to the outputs Xe and Xf of the peak hold circuits 5a and 5b calculates the difference: $g=(Xe-Xf)$ between the outputs Xe and Xf of the peak hold circuits 5a and 5b, and outputs the difference g (whose waveform is shown in the bottom row (g) in FIG. 1) to a low pass filter 7. Except when the servo head 2 is at the index portion, the difference g has a substantially rectangular waveform of alternating positive and negative levels whose durations are equal to each other and to half the period of the pulse trains e and f. However, at the index portion, the duration of the positive level of the waveform g is doubled at an occurrence of 0 in the index pattern. The heights of the positive level and negative level of the rectangular waveform g correspond to the radial position of the head 2. When the head 2 is precisely positioned between the odd and even tracks (b) and (c), the heights of the positive level and the negative level are equal. The low pass filter 7 coupled to the output g of the subtractor 6 thus outputs a signal h whose small variation is centered around a level that corresponds to the radial position of the servo head 2. When the head 2 is precisely positioned in the radial direction, the variation of the signal h is centered around the zero level 0. Thus, the signal h is used as the radial position signal.

However, the conventional index pattern as illustrated in row (a) in FIG. 1 has the following problem: As shown in the bottom row (g) in FIG. 1, the radial position signal h is deviated from the level 0 at the index portion, even in the case where the servo head 2 is precisely positioned in the radial direction between odd and even tracks (b) and (c). When the head 2 is at the index portion, the level of the radial position signal h is deviated from the level which corresponds to the radial position of the servo head 2. Thus, the radial positioning of the magnetic head of the information processing apparatus is adversely affected by the index pattern. The results from the fact that missing pairs of dibits, represented by 0's in row (a), occur in short intervals, with only one or two 1's inserted therebetween.

SUMMARY OF THE INVENTION

The primary object of this invention is to provide a magnetic disk device (such as a magnetic disk pack including a plurality of coaxially stacked magnetic disks) having a servo surface of the above type, wherein the index portion of the servo tracks for marking a circumferential position of the servo tracks on the servo surface does not adversely affect the radial position signal obtained from the dibits recorded on the servo tracks. More particularly, this invention aims at providing an index pattern on the servo tracks which serves the purpose of marking a starting and ending position of the tracks, but does not give adverse effects to the level of the radial position signal obtained from the positive and negative dibits recorded on an adjacent pair of odd and even numbered servo tracks.

The above object is accomplished in accordance with the principle of this invention in a magnetic disk device comprising a a servo recording surface having a special index pattern according to this invention formed at a predetermined circumferential position on the servo tracks on the servo recording surface. As in the case of the magnetic disk pack described above, the index pattern consists of missing dibit pairs on the odd and even numbered servo tracks on the servo recording surface. However, according to this invention, at least three non-missing pairs of succeeding dibits on adjacent pairs of odd and even numbered tracks are interposed between missing pairs of succeeding dibits on adjacent pairs of odd and even numbered tracks. Thus, to use the convention of representing missing dibit pairs by 0's and non-missing dibit pairs by 1's, the index pattern according to this invention may take the forms: 01110, 011110, 0111110, etc.

The structure of the servo recording surface is otherwise similar to that described above in reference to FIG. 1, and the position signal is obtained by means of a circuit as shown in FIG. 3 from the positive and negative dibits recorded on the odd and even numbered tracks on the servo recording surface.

The deviation of the radial position signal from the level corresponding to the radial position of the servo head is caused by missing pairs of dibits in the index pattern formed in the servo tracks on the servo recording surface. However, according to this invention, this deviation of the radial position signal is suppressed to a minimum. The deviation of the radial position signal caused by a missing dibit pair is quickly diminished by at least three succeeding non-missing dibit pairs according to this invention. Thus, before a missing dibit pair occurs, the level of the radial position signal returns to the level that corresponds to the radial position of the servo head relative to the servo recording surface. As a result, the deviation of the radial position signal caused by the index pattern can be minimized according to this invention.

BRIEF DESCRIPTION OF THE DRAWINGS

The novel features which are believed to be characteristic of this invention are set forth with particularity in the appended claims. This invention itself, however, both as to its organization and method of operation, may best be understood from the following description of the preferred embodiments, taken in conjunction with the accompanying drawings, in which:

FIG. 4 is a diagram showing the index patterns according to this invention, together with a conventional pattern.

In the drawings, like reference numerals and characters represent like or corresponding parts or waveforms of the signals.

DETAILED DESCRIPTION OF THE PREFERRED EMBODIMENTS

The magnetic disk pack according to this invention, except for the index pattern formed in the servo tracks on the servo surface of the pack, is identical to that described above in reference to FIGS. 1 and 2. Thus, the disk pack consists of a plurality of (e.g. twelve) coaxially stacked magnetic disks which are rotatably accommodated in a housing. Data are recorded on the concentric tracks formed on the data recording surfaces formed on the magnetic disks. The disks in the pack are rotated together when information is written into or read out from the data recording surfaces of the disks. A servo recording surface is formed on one of the disks of the pack for generating position signals via a servo magnetic head. The servo recording surface comprises concentric servo tracks on which a regular pattern of positive and negative dibits are recorded, as described above. At a certain circumferential position, i.e., at the starting and ending point of the tracks, some of the dibits are dropped to form an index pattern which marks the circumferential position of the starting and ending point of the tracks. For further details of the structure of the servo recording surface and of the device for obtaining position signals from the servo signals (dibits) recorded on the servo tracks thereon, reference may be had to the above description made in reference to FIGS. 1 through 3.

Figure 1:
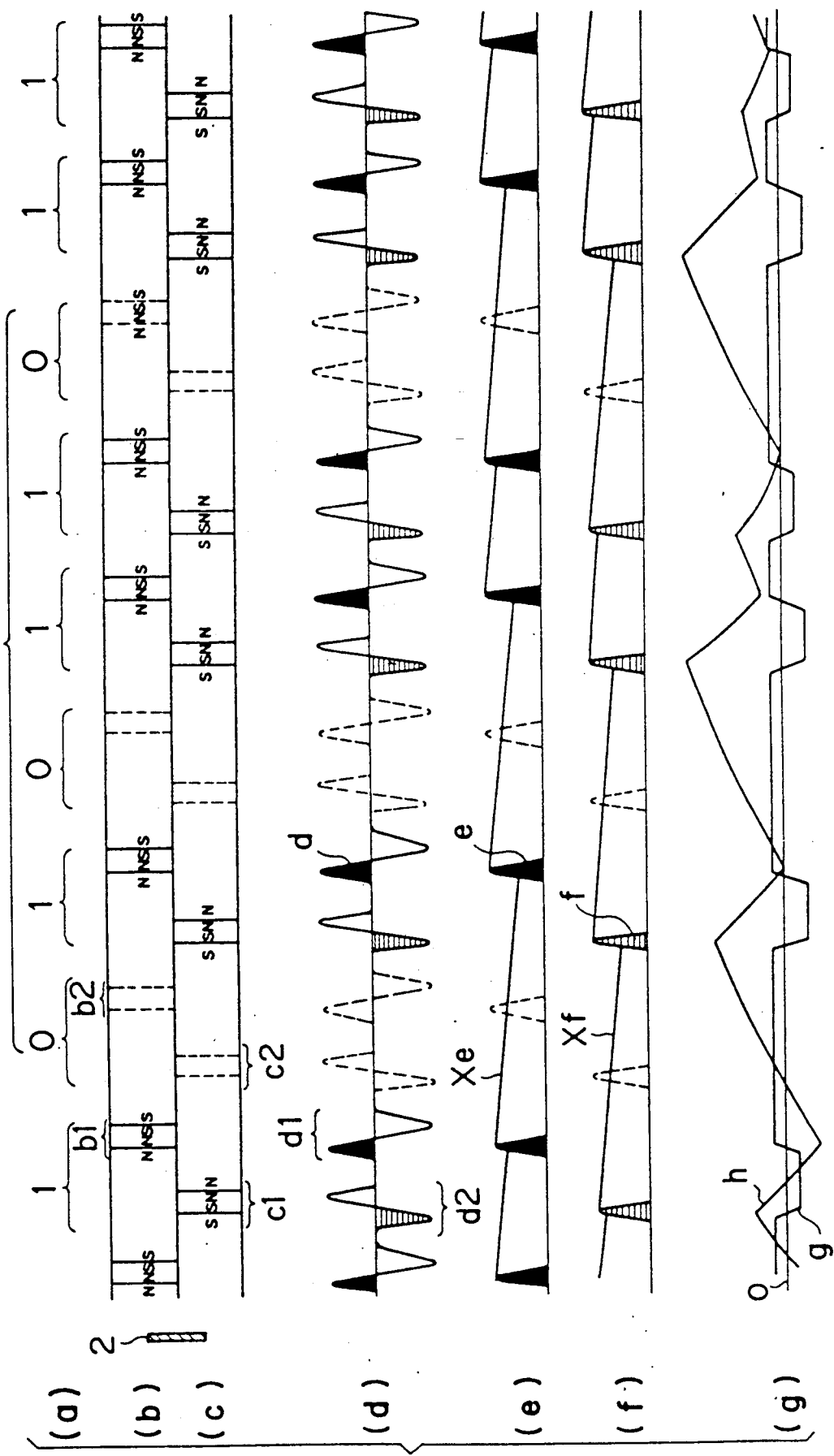
FIG. 1 is a diagram showing a conventional index pattern on a servo recording surface of a magnetic disk pack, together with waveforms of the signals generated by the index pattern.
Figure 2:
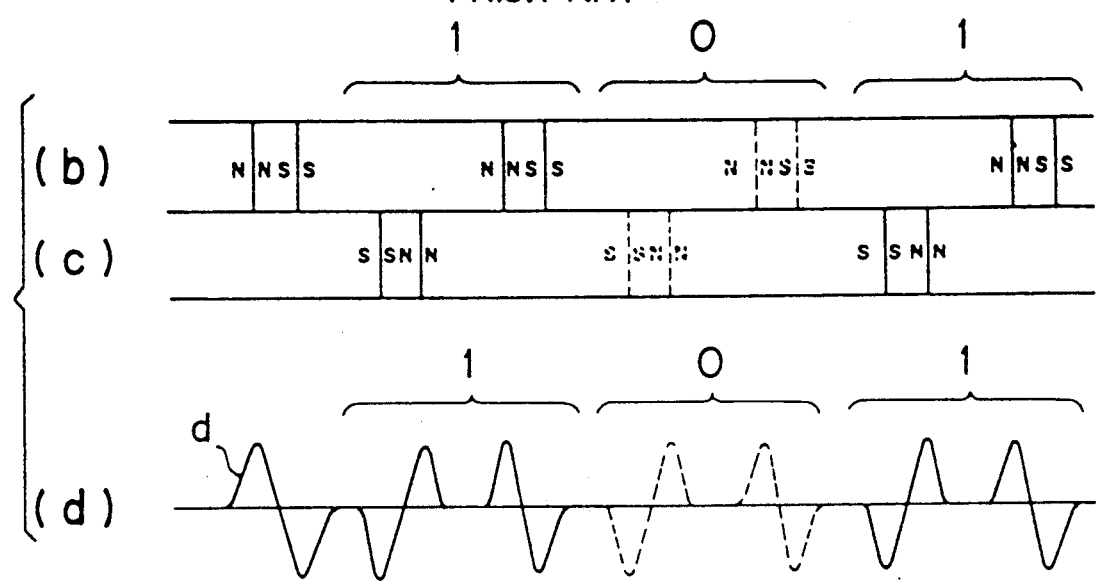
FIG. 2 shows the relation between the index pattern and the output of the servo head in detail.

Referring now to FIG. 4 of the drawings, let us describe the index patterns formed on the servo tracks according to this invention. The index pattern in the top row (M1) in FIG. 4, namely, the pattern: 010110, is the conventional pattern which is illustrated in FIG. 1 and described above in reference thereto. The patterns illustrated in rows (M2) through (M6), on the other hand, are those according to this invention. As in the above description made in reference to FIGS. 1 and 2, a numeral 1 represents a pair consisting of a negative dibit (on an even numbered servo track) and an immediately succeeding positive dibit (on an adjacent even numbered servo track). A numeral 0 represents a missing pair of such a pair in the index portion of the servo track. As shown in FIG. 2 in detail, the pairs consisting of a negative and an immediately succeeding positvie dibit on the adjacent even and odd numbered tracks (b) and (c) represented by 1's, the missing of such a pair by a 0. The portion represented in FIG. 2 comprises the pattern: 101. Accordingly, the output waveform d of the servo head comprises a corresponding dibit pair pattern of 101, wherein the missing dibit pair is represented by a dotted curve.

In the index patterns according to this invention, not less than three 1's (i.e. non-missing dibit pairs) are inserted between two adjacent 0's (i.e. missing dibit pairs). Thus, the row (M2) illustrates the index pattern: 011110, in which four 1's are interposed between a pair of 0's; the row (M3) comprises the index pattern: 0111110, in which five 1's are interposed between a pair of 0's; the row (M4) comprises the index pattern: 01111110, in which six 1's are interposed between a pair of 0's; the row (M5) comprises the index pattern: 011111110, in which seven 1's are interposed between a pair of 0's, and so on.

Figure 5:
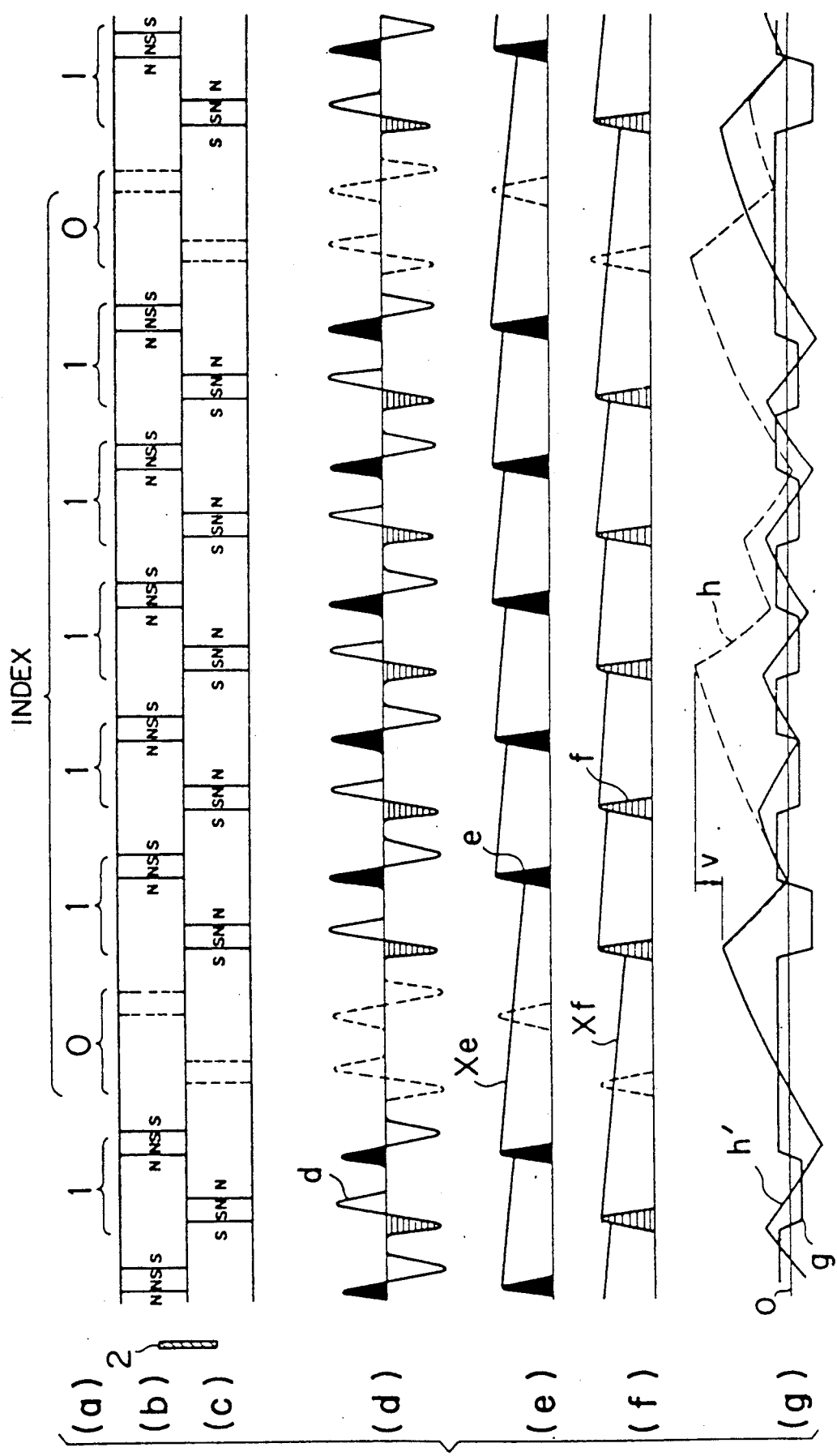
FIG. 5 is a diagram similar to that of FIG. 1, but showing an index pattern according to this invention, together with the waveforms of the signals generated by the index pattern.

The top three rows (a) through (c) in FIG. 5 show a representative adjacent pair of odd and even numbered servo tracks (b) and (c) whose index portion consists of the pattern identical to that illustrated in row (M3) in FIG. 4, as shown in the top row (a) in FIG. 5. The radial position signal is obtained by means of the circuit diagram shown in FIG. 3, in a manner similar to that described above in reference thereto.

Thus, the servo head 2 moves, relative to the servo recording surface, between the odd and even numbered tracks on the rotating servo surface of a magnetic disk 1 to supply to the amplifier 3 an output voltage having the waveform d shown in FIG. 5. The amplifier 3 outputs an amplified waveform d to a discriminator circuit 4 coupled thereto. The discriminator circuit 4 discriminates the positive and the negative dibits d1 and d2 from each other, and output pulse trains e and f whose waveforms are shown at rows (e) and (f) in FIG. 5. The peak hold circuits 5a and 5b coupled to the outputs e and f of the discriminator circuit 4, respectively, effect the peak level holding operation of output signals Xe and Xf, respectively, whose waveforms are shown at rows (e) and (f) in FIG. 5. Further, the subtractor 6 coupled to the outputs Xe and Xf of the peak hold circuits 5a and 5b calculates the difference between the outputs Xe and Xf: $g=(Xe-Xf)$, and outputs the difference g (whose waveform is shown in the bottom row (g) in FIG. 5) to a low pass filter 7. The low pass filter 7 coupled to the output g of the subtractor 6 thus outputs a radial position signal h' whose small variation is centered around a level that corresponds to the radial position of the servo head 2.

Figure 3:
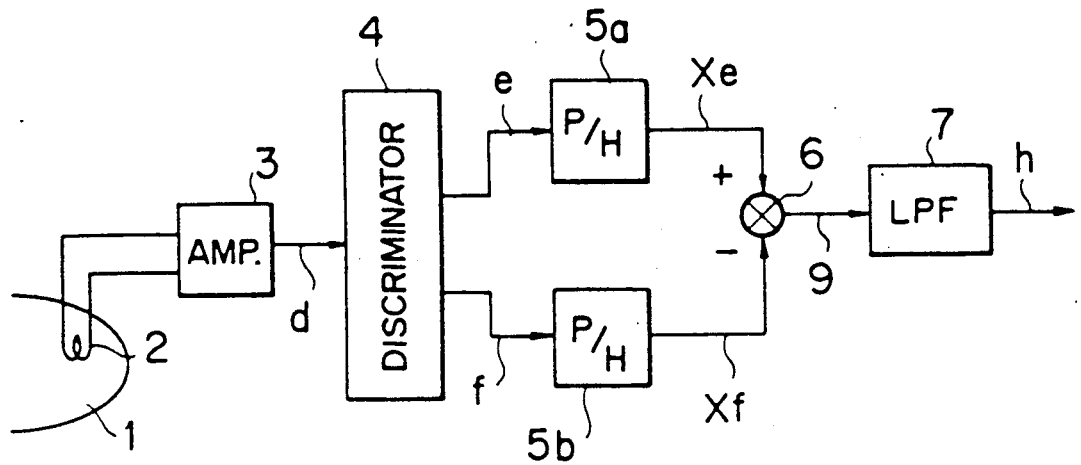
FIG. 3 is a circuit diagram showing a circuit for generating a position signal from the output of the servo head.

Thus, the circuit of FIG. 3 generates a radial position signal h' when the servo head 2 moves over the neighborhood of the index pattern: 0111110 according to this invention, which is shown in the top row (a) in FIG. 5. The operation of the circuit of FIG. 3 for the generation of the position signal h' is similar to the operation thereof for the generation of the position signal h from the conventional index pattern shown in FIG. 1. However, the deviation of the radial position signal h' from the level 0 (corresponding to the radial position of the servo head 2) is reduced by a value V, compared with the deviation of the radial position signal h' (resulting from the conventional index pattern) shown by a dotted curve in row (g) in FIG. 5.

This reduction value V of the deviation of the radial position signal h' with respect to the deviation of the radial position signal h results from the insertion of not less than three non-missing dibit pairs, represented by 1s in row (a) in FIG. 5, between adjacent missing dibit pairs, represented by 0s, according to this invention. An occurence of a missing dibit pair doubles the duration of a positive level of rectangular waveform signal g, as shown in row (g), which causes a deviation of the position signal h from the level 0 corresponding to the radial position of the servo head 2. However, according to this invention, this deviation of the radial position signal h' is quickly suppressed to a stable minimum magnitude by the succeeding non-missing dibit pairs whose number is not less than three. In contrast thereto, the deviation of the radial position signal h resulting from the conventional index pattern is reinforced by a succeeding missing dibit pair before the deviation returns to the stable minimum magnitude, since only one non-missing dibit pair is inserted between a first and a second missing dibit pair in the conventional index pattern: 010110. Thus, the deviation of the radial position signal h' according to this invention is reduced by a value V compared with the deviation of the radial position signal h obtained from the conventional index pattern.

While we have described and shown the particular embodiments of our invention, it will be understood that many modifications may be made without departing from the spirit thereof. For example, all the index patterns according to this invention, (M2) through (M6), shown in FIG. 4 comprise only two 0's (missing dibit pairs) disposed at the two ends of each pattern, the 1's (non-missing dibit pairs) whose number is not less than three being interposed therebetween. Index patterns which comprise more than two 0's may be used according to the principle of this invention, provided that not less than three 1's are inserted between adjacent 0's; an example of such an index pattern may be the following pattern: 011101110. We intend to cover any such modifications as fall within the true spirit and scope of our invention.

What is claimed is:

1. A magnetic disk device comprising:
a magnetic disk having a servo recording surface for generating a position signal via a servo head of an information processing apparatus, the position signal having variations centered around a level corresponding to a radial position of the servo head, the servo head changing position relatively along a circumferential direction of the servo recording surface as said magnetic disk rotates between odd and even numbered servo tracks formed thereon, said servo recording surface including:
concentric odd numbered tracks along which dibits of a first polarity are formed at a fixed circumferential spacing;
concentric even numbered tracks alternating with said odd number tracks in a radial direction of the servo recording surface, dibits of a second polarity opposite to the first polarity being formed on the even numbered tracks at the same fixed circumferential spacing as on the odd numbered tracks, the dibits on the even numbered tracks being circumferentially displaced with respect to the dibits on the odd numbered tracks by half said circumferential spacing between the dibits on the odd and even numbered tracks; and
an index portion formed at a predetermined circumferential position of said odd and even numbered tracks to mark the circumferential position, said index portion including a pattern of missing pairs of succeeding dibits on adjacent pairs of odd and even numbered tracks, wherein at least three non-missing pairs of succeeding dibits on adjacent pairs of odd and even numbered tracks are interposed between a missing pair of dibits and a next missing pair of dibits on adjacent pairs of odd and even numbered tracks;
wherein the position signal deviates from the level responsive to a missing pair of dibits, and the deviation from the level is reduced responsive to the at least three non-missing pairs of succeeding dibits between the missing pair of dibits and the next missing pair of dibits.

2. An information processing system comprising:
a magnetic disk having a servo recording surface including (a) concentric odd numbered tracks along which dibits of a first polarity are formed at a fixed circumferential spacing, (b) concentric even numbered tracks alternating with said odd numbered tracks in a radial direction of the servo recording surface, dibits of a second polarity opposite to the first polarity being formed on the even numbered tracks at the same fixed circumferential spacing as on the odd numbered tracks, the dibits on the even numbered tracks being circumferentially displaced with respect to the dibits on the odd numbered tracks by half said circumferential spacing between the dibits on the odd and even numbered tracks, and (c) an index portion formed at a predetermined circumferential position of said odd and even numbered tracks, said index portion including a pattern of missing pairs of succeeding dibits on adjacent pairs of odd and even numbered tracks, wherein at least three non-missing pairs of succeeding dibits on adjacent pairs of odd and even numbered tracks are interposed between a missing pair of dibits and a next missing pair of dibits on adjacent pairs of odd and even numbered tracks;
a servo head which changes position relative to the servo recording surface of the magnetic disk in a circumferential direction as the magnetic disk rotates between a pair of adjacent odd and even numbered tracks for generating a signal having a waveform corresponding to the dibits formed on the adjacent odd and even numbered tracks;
a discriminator, coupled to an output of said servo head, for receiving the signal generated by said servo head and outputting a first pulse train consisting of pulses corresponding to dibits on the odd numbered track, and a second pulse train consisting of pulses corresponding to dibits on the even numbered track;

a first peak hold circuit, coupled to the discriminator, for receiving the first pulse train and holding each peak level of the first pulse train, wherein the level held by the first peak hold circuit decreases at a predetermined time constant after each peak;

a second peak hold circuit, coupled to the discriminator, for receiving the second pulse train and holding each peak level of the second pulse train, wherein the level held by the second peak hold circuit decreases at a predetermined time constant after each peak;

a subtractor, coupled to said first and second peak hold circuits, for receiving the peak levels of the first and second pulse trains and outputting a difference between the levels held in said first and second peak hold circuits; and a low pass filter, coupled to the subtractor, for receiving the difference and outputting a radial position signal for a magnetic head of the information processing system, the radial position signal having variations centered around a level corresponding to a radial position of said servo head, wherein the radial position signal deviates from the level responsive to a missing pair of dibits, and the deviation from the level is reduced responsive to the at least three non-missing pairs of succeeding dibits between the missing pair of dibits and the next missing pair of dibits.

3. A magnetic disk device including:

a magnetic disk having a servo recording surface including first and second tracks radially adjacent to each other, the first track having a plurality of dibits, each dibit including a first portion of a first polarity followed by a second portion of a second polarity opposite to the first polarity, recorded therein at circumferential intervals of a fixed circumferential spacing, the second track having a plurality of dibits, each dibit including a first portion of the second polarity followed by a second portion of the first polarity, recorded therein at circumferential intervals of the fixed circumferential spacing and displaced by half of the fixed circumferential spacing with respect to the dibits recorded in the first track, adjacent ones of the dibits recorded in the first and second tracks forming pairs of dibits, the first and second tracks including index portions which mark starting and ending points of the first and second tracks formed at a predetermined circumferential position in which, in at least one of the circumferential intervals, the first and second tracks are blank, wherein, for each circumferential interval at which the first and second tracks are blank, pairs of dibits are recorded in at least three succeeding circumferential intervals of the first and second tracks;

a servo head of an information processing apparatus mounted to be movable radially over the servo recording surface of said magnetic disk for reading the dibits recorded on the first and second tracks and outputting a waveform corresponding to the dibits read;

a discriminator circuit connected to receive the waveform output from said servo head and for producing a first pulse train corresponding to the first portions of the dibits read from the first track, and a second pulse train corresponding to the first portions of the dibits read from the second track;

first and second peak hold circuits connected to receive the first and second pulse trains, respectively, and to output first and second peak hold waveforms, respectively;

a subtractor connected to receive the first and second peak hold waveforms and to output a difference waveform having a first portion corresponding to circumferential intervals at which the pairs of dibits are recorded in the first and second tracks, and a second portion corresponding to circumferential intervals at which the first and second tracks are blank, the difference waveform having alternating positive and negative levels, the positive and negative levels being of equal duration in the first portion, the positive levels being of double duration relative to the negative levels in the second portion, heights of the positive and negative levels being equal if said servo head is positioned precisely between the first and second tracks; and a low pass filter connected to receive the difference waveform and to produce a radial position signal having variations centered around a level corresponding to the radial position of said servo head, wherein, when said servo head is precisely positioned between the first and second tracks, the level about which the variations are centered is zero volts, wherein the radial position signal deviates from the level at circumferential intervals at which the first and second tracks are blank, and wherein a deviation of the signal at the circumferential intervals at which the first and second tracks are blank is diminished over the at least three succeeding circumferential intervals at which dibit pairs are recorded in the first and second tracks.

* * * * *